US010727999B2

(12) United States Patent
Byun et al.

(10) Patent No.: US 10,727,999 B2
(45) Date of Patent: Jul. 28, 2020

(54) METHOD AND DEVICE FOR RECEIVING SIGNAL IN WIRELESS COMMUNICATION SYSTEM TO WHICH MULTIPLEX TRANSMISSION TECHNIQUE IS APPLIED

(71) Applicant: LG ELECTRONICS INC., Seoul (KR)

(72) Inventors: Ilmu Byun, Seoul (KR); Jiwon Kang, Seoul (KR); Heejeong Cho, Seoul (KR); Genebeck Hahn, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,254

(22) PCT Filed: Jun. 19, 2017

(86) PCT No.: PCT/KR2017/006400
§ 371 (c)(1),
(2) Date: Nov. 30, 2018

(87) PCT Pub. No.: WO2017/222257
PCT Pub. Date: Dec. 28, 2017

(65) Prior Publication Data
US 2019/0334672 A1 Oct. 31, 2019

Related U.S. Application Data

(60) Provisional application No. 62/353,574, filed on Jun. 23, 2016.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 5/0007* (2013.01); *H04L 5/0055* (2013.01);
(Continued)

(58) Field of Classification Search
None
See application file for complete search history.

(56) References Cited

U.S. PATENT DOCUMENTS

2011/0201371 A1* 8/2011 Kwon ................ H04W 72/082
455/509
2011/0235608 A1 9/2011 Koo et al.
(Continued)

OTHER PUBLICATIONS

PCT International Application No. PCT/KR2017/006400, International Search Report dated Sep. 12, 2017, 4 pages.

*Primary Examiner* — Christine T Duong
(74) *Attorney, Agent, or Firm* — Lee Hong Degerman Kang & Waimey

(57) ABSTRACT

A method and a device for receiving a signal in a wireless communication system to which a multiplex transmission technique is applied are provided. The wireless communication system proposed therein suggests a method for performing multiplex transmission when base stations within a network are synchronized. Particularly, a terminal receives, from a first base station, control information for the transmission of an M number of transmission blocks. The control information includes information for allocating multiplex transmission resources available for the first base station and a second base station during a predetermined subframe. The terminal receives the M number of transmission blocks from the first base station and the second base station via the multiplex transmission resources. Here, the M number of transmission blocks receives from the first base station and the M number of transmission blocks received from the
(Continued)

second base station are decoded by using the same reference signal.

13 Claims, 18 Drawing Sheets

(51) Int. Cl.
*H04W 72/04* (2009.01)
*H04W 92/20* (2009.01)
(52) U.S. Cl.
CPC ..... *H04L 27/2601* (2013.01); *H04W 72/0406* (2013.01); *H04W 92/20* (2013.01)

(56) References Cited

U.S. PATENT DOCUMENTS

| | | | |
|---|---|---|---|
| 2012/0188953 A1* | 7/2012 | Won | H04W 72/0406 370/329 |
| 2013/0077521 A1 | 3/2013 | Feng et al. | |
| 2013/0156001 A1 | 6/2013 | Gomadam | |
| 2015/0139151 A1* | 5/2015 | Seo | H04J 13/18 370/329 |
| 2016/0205674 A1* | 7/2016 | Zhang | H04L 25/0226 370/330 |

* cited by examiner

FIG. 12
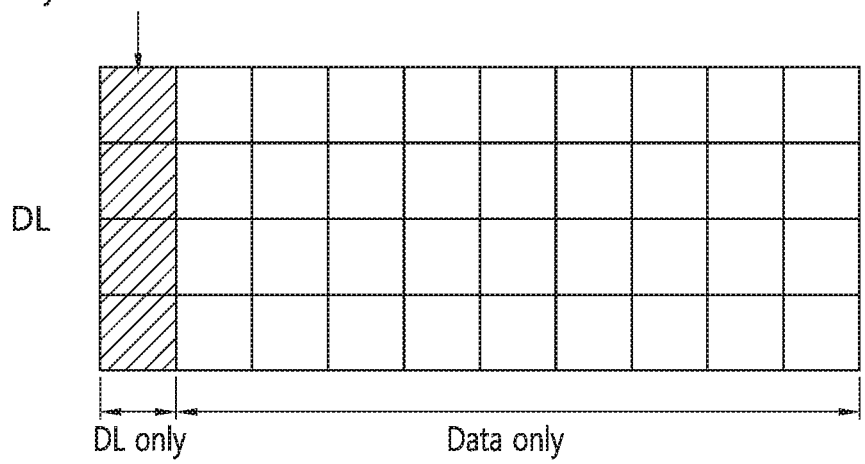
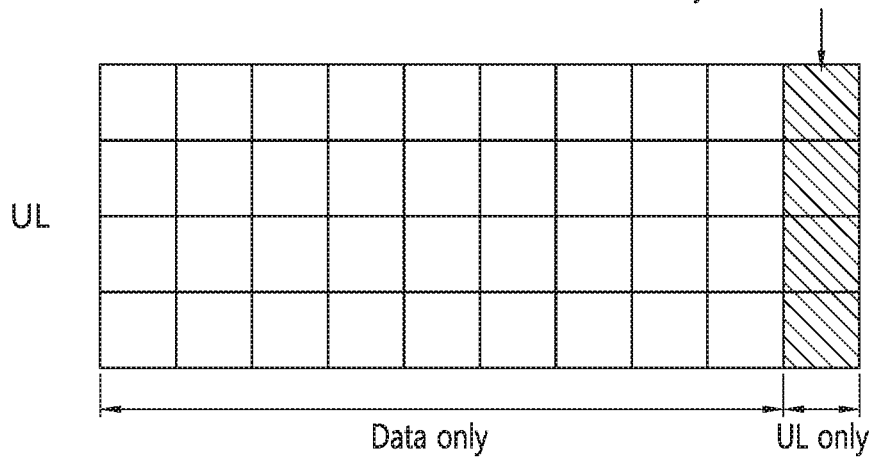

FIG. 15
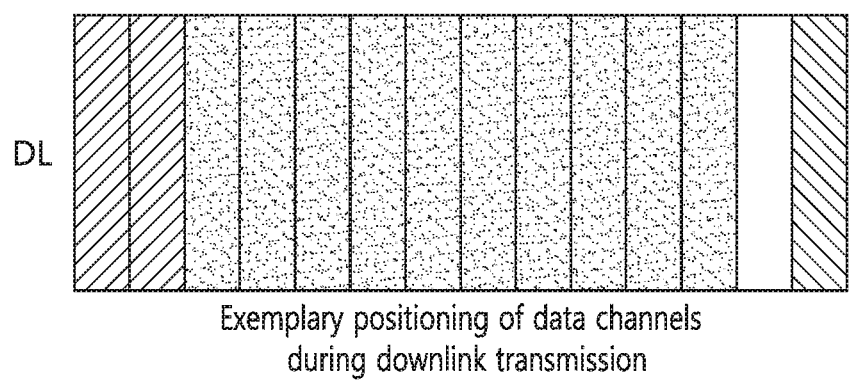
Exemplary positioning of data channels
during downlink transmission
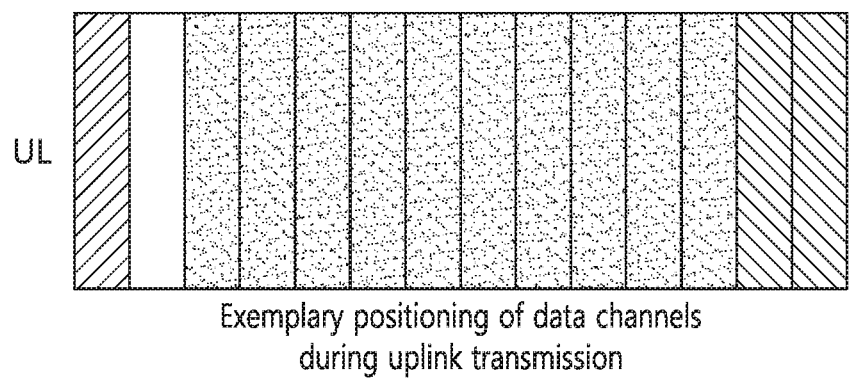
Exemplary positioning of data channels
during uplink transmission
 : Downlink control channel     : Guard period
 : Uplink control channel     : Data channel

METHOD AND DEVICE FOR RECEIVING SIGNAL IN WIRELESS COMMUNICATION SYSTEM TO WHICH MULTIPLEX TRANSMISSION TECHNIQUE IS APPLIED

CROSS-REFERENCE TO RELATED APPLICATIONS

This application is the National Stage filing under 35 U.S.C. 371 of International Application No. PCT/KR2017/006400, filed on Jun. 19, 2017, which claims the benefit of U.S. Provisional Application No. 62/353,574, filed on Jun. 23, 2016, the contents of which are all hereby incorporated by reference herein in their entirety.

BACKGROUND OF THE INVENTION

Field of the Invention

The present invention relates to wireless communication and, most particularly, to a method for receiving a signal in a wireless communication system to which a multiple-transmission technique is applied, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A Coordinated Multi-Point system (hereinafter referred to as a system performing CoMP operations) refers to a system for enhancing throughput of a user being located at a cell boundary by applying enhanced multiple-input multiple-output (MIMO) transmission in a multi-cell environment. When a system performing CoMP operations is applied, inter-cell interference within a multi-cell environment may be reduced. If a system performing such CoMP operations is used, the user equipment (UE) may be capable of receiving shared data from a multi-cell base station.

However, in the next generation wireless communication systems, the issue of transmitting highly reliable data within a short period of time is becoming more important. Accordingly, manifold transmission for high reliability low latency communication may be taken into consideration.

SUMMARY OF THE INVENTION

Technical Objects

This specification provides a method and device for receiving a signal in a wireless communication system to which a multiple-transmission technique is applied.

Technical Solutions

This specification proposes a method and device for receiving a signal in a wireless communication system applying a manifold transmission (or multiple-transmission) technique (or method).

The device includes a radio frequency (RF) unit transmitting and receiving radio signals, and a processor being operatively connected to the RF unit.

The terms will first be described. A manifold transmission (or multiple transmission) method (or technique) refers to a technique for maximizing the number of signal transmission sessions and diversity within a limited time by using multiple paths. The manifold transmission may also be referred to as multi-path transmission or manifold transmission. A first base station may correspond to the primary TRP, and a second base station may correspond to the secondary TRP. In this specification, a subframe may be replaced with a slot.

Firstly, a user equipment (UE) receives control information for transmitting M number of transport blocks from a first base station. The control information includes allocation information for manifold transmission resources that may be used by the first base station and a second base station during a predetermined subframe. Since the value M is an integer being equal to or greater than 1, one transport block may be used, or a plurality of transport blocks may be used. Unlike in the legacy CoMP method, in the manifold transmission method, each base station may respectively transmit a signal without establishing any cooperation between the base stations.

The UE receives a first reference signal from the first base station through the manifold transmission resources. The UE receives a second reference signal from the second base station through the manifold transmission resources. The first reference signal and the second reference signal are identical to one another.

The UE receives the M number of transport blocks from the first base station through the manifold transmission resources. The UE receives the M number of transport blocks from the second base station through the manifold transmission resources. At this point, the M number of transport blocks received from the first base station and the M number of transport blocks received from the second base station may be decoded by using the same reference signal.

According to the proposed technique (or method), in a situation where the synchronization of the base stations within the network matches, the first base station signals to the UE through the control information that both the first base station and the second base station within the base station group applying the manifold transmission method use the manifold transmission resources. At this point, since the UE does not know which base station is transmitting the transport block, if the manifold transmission resources are configured, the first base station as well as the second base station may transmit signals freely.

Additionally, the manifold transmission resources may be allocated to a subcarrier band in a distributed format during the predetermined subframe. Thus, a frequency diversity gain may be achieved.

Additionally, the UE may receive a manifold transmission activation indicator from the first base station. The manifold transmission activation indicator may indicate that both the first base station and the second base station may transmit the M number of transport blocks during the predetermined subframe. At this point, the first reference signal, a Modulation and Coding scheme (MCS) for a first transport block, among the M number of transport blocks, and a process ID may be received along with the manifold transmission activation indicator.

The MCS for a transport block may correspond to a symbol modulation scheme (or method) of the transport block and a code rate of a channel code. Since the first base station and the second base station transmit the M number of transport blocks to the UE without establishing any cooperation between one another, the UE may receive the transport blocks being transmitted from each of the first base station and the second base station as transport blocks that are being retransmitted. In order to receive the transport blocks being transmitted by each of the first base station and the second base station, a retransmission process ID is needed.

Additionally, the UE may combine the M number of transport blocks received from the first base station and the M number of transport blocks received from the second base station and may then perform decoding. At this point, the M number of transport blocks received from the first base station and the M number of transport blocks received from the second base station may be decoded by using the same MCS and/or the same temporary identifier.

Additionally, the UE may receive, from the first base station, a number of Orthogonal Frequency Division Multiplexing (OFDM) symbols that are used by the first base station and the second base station, during the predetermined subframe, for transmitting the M number of transport blocks. Since each of the TRPs uses the same modulation method and code rate, a number of OFDM symbols within a subframe being used by the base stations, which are included in the base station group being applied to the manifold transmission method, for transmitting transport blocks (data) applying the manifold transmission may be designated.

Additionally, in case the value M is an integer being greater than 1, the value M may correspond to a number of process IDs. This is based on the ability of the UE of receiving the transport blocks, which are transmitted from each of the first base station and the second base station, as though the corresponding transport blocks are retransmitted. For example, in order to allow four transport blocks to be received in the manifold transmission resources, the UE may be allocated with Process ID 1 to Process ID 4.

Moreover, the UE may transmit ACK signals corresponding to each of the M number of transport blocks to the first base station. When all of the ACK signals corresponding to the M number of transport blocks are transmitted, the resource allocation of the manifold transmission resources may be released (or cancelled). The resources to which the ACK signals corresponding to each of the M number of transport blocks are transmitted may be determined based on the indexes of the manifold transmission resources and the process IDs.

Furthermore, a reference signal for performing downlink channel estimation that is used by the first base station and a reference signal for performing downlink channel estimation that is used by the second base station may be respectively configured of sequences that are orthogonal to one another. In order to achieve an effect of having the transport blocks, which are transmitted from each base station, be combined in the UE, in a situation where the same reference signal is allocated, each base station is required to determine in advance the channel characteristics between the base station itself and the UE. Therefore, the reference signals for performing channel estimation may be configured to be orthogonal to one another for each base station.

Effects of the Invention

When using the proposed technique (or method), by increasing the number of transmissions of a packet and the diversity within a restricted (or limited) period of time, a packet transmission likelihood may be increased within a target time.

BRIEF DESCRIPTION OF THE DRAWINGS

FIG. 12 shows an exemplary structure of a self-contained frame in an FDD communication system according to an exemplary embodiment of this specification.

FIG. 15 shows an example of positioning OFDM symbols for data transmission in a self-contained frame structure according to an exemplary embodiment of this specification.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
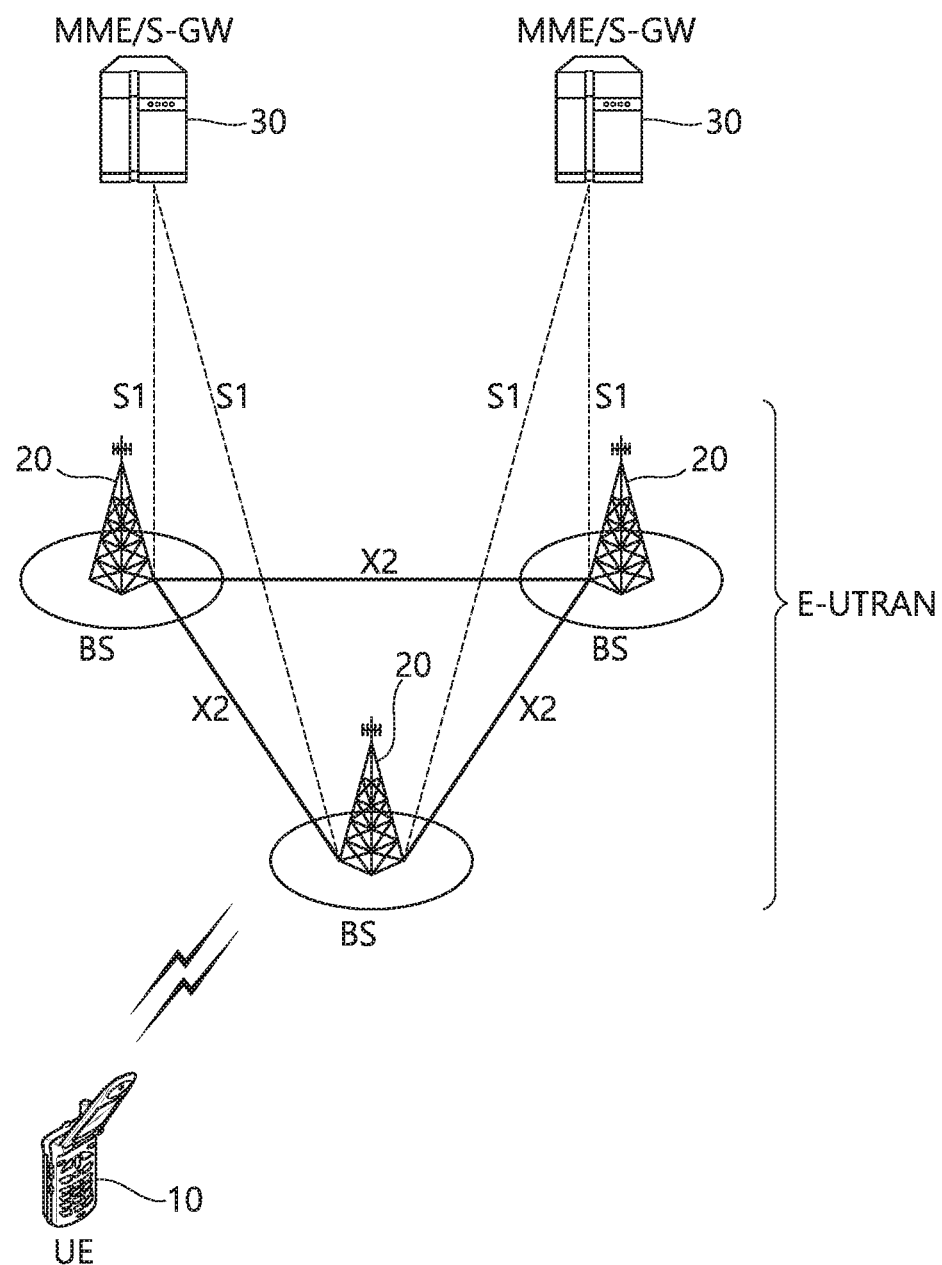
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
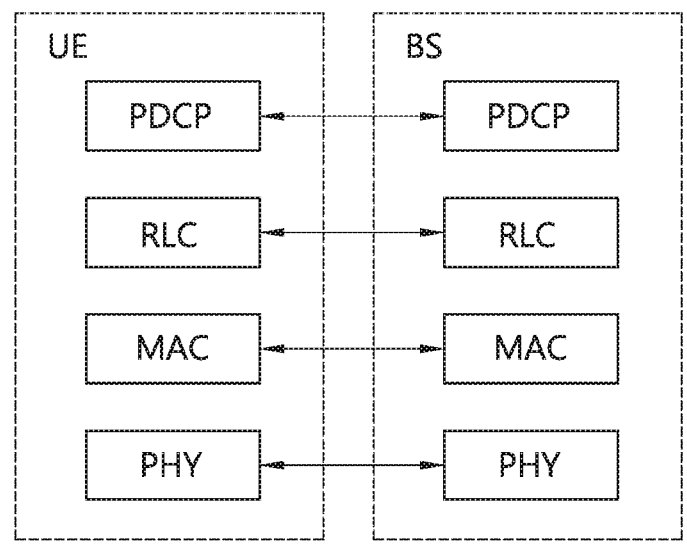
FIG. 2 is a diagram illustrating a radio protocol architecture for a user plane.
Figure 3:
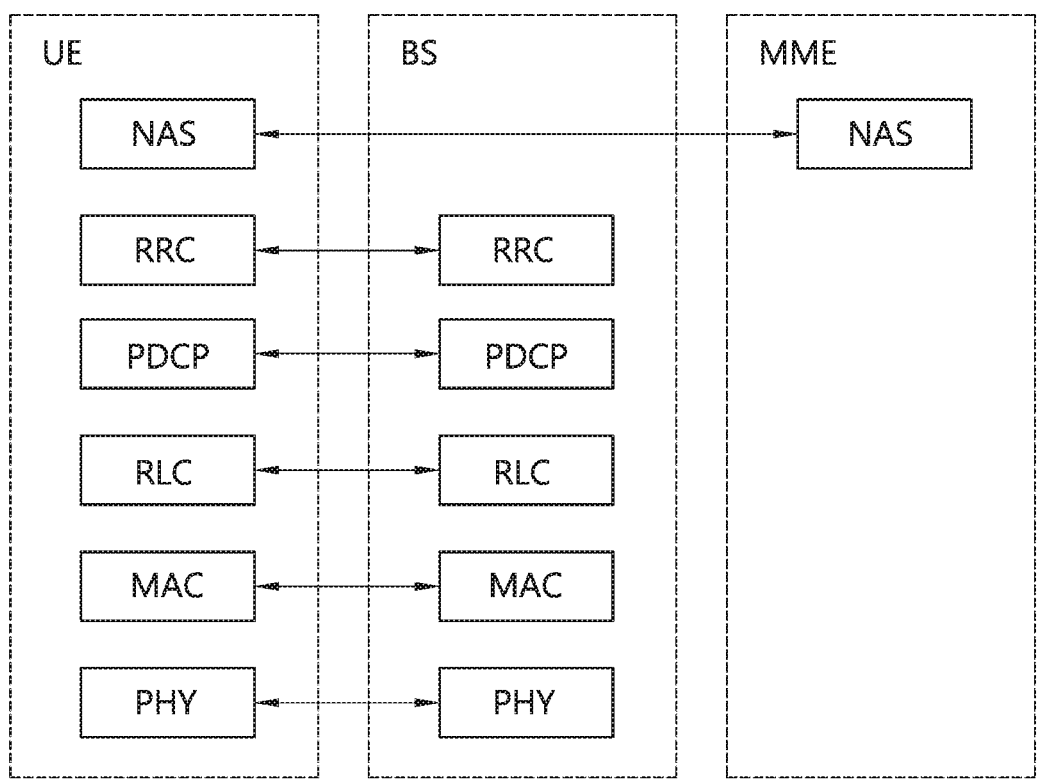
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), and so on.

Figure 4:
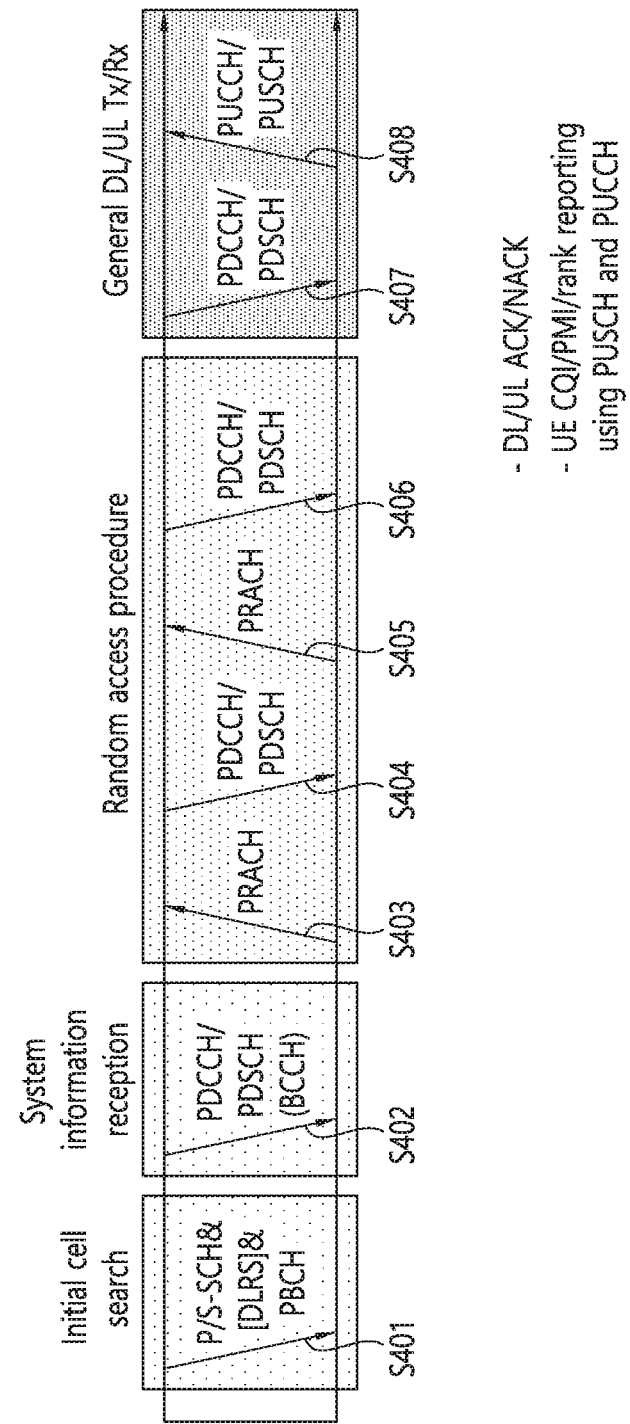
FIG. 4 is a diagram describing a physical channel and a method for transmitting signals by using the physical channel in 3GPP LTE.

FIG. 4 is a diagram describing a physical channel and a method for transmitting signals by using the physical channel in 3GPP LTE.

When power of a user equipment (UE) is turned on from a state in which the power of the UE was turned off, or when a UE newly enters (or accesses) a cell, the UE equipment performs an initial cell search process, such as synchronizing itself with the base station, and so on (S401). In order to do so, the UE may receive a primary synchronization channel (P-SCH) and a secondary synchronization channel (S-SCH) from the base station, thereby being capable of synchronizing itself with the base station and acquiring information, such as cell ID. Thereafter, the UE may receive a physical broadcast channel (PBCH), thereby being capable of acquiring broadcast information within the cell. Meanwhile, the UE may receive a downlink reference signal (DL RS), during the step of performing the initial cell search, so as to verify (or check) the downlink channel status.

Once the UE has completed the initial cell search, the corresponding UE may receive a PDDCH and a PDSCH, thereby being capable of acquiring more detailed system information (S402).

Meanwhile, in case the UE accesses the base station for the first time (or in case the UE performs an initial access to the base station), or in case there is no radio resource, the UE may perform a random access procedure, such as in step S403 to step S406. In order to do so, the UE may transmit a specific sequence through a PRACH as a preamble (S403), and then the UE may receive a response message respective to the random access through the PDCCH and its corresponding PDSCH (S404). In case of a contention based random access excluding the case of a handover, the UE may perform a contention resolution procedure, such as additional PRACH transmission (S405) and PDCCH/PDSCH reception (S406) that follow.

After performing the above-described procedures, the UE may perform PDCCH/PDSCH reception (S407) and PUSCH/PUCCH transmission (S408) as a general uplink/downlink signal transmission procedure. At this point, control information being transmitted to the base station via uplink or control information being received by the UE from the base station includes downlink/uplink ACK/NACK signals, a channel quality indicator (CQI), a precoding matrix index (PMI), a rank indicator (RI), and so on.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 5:
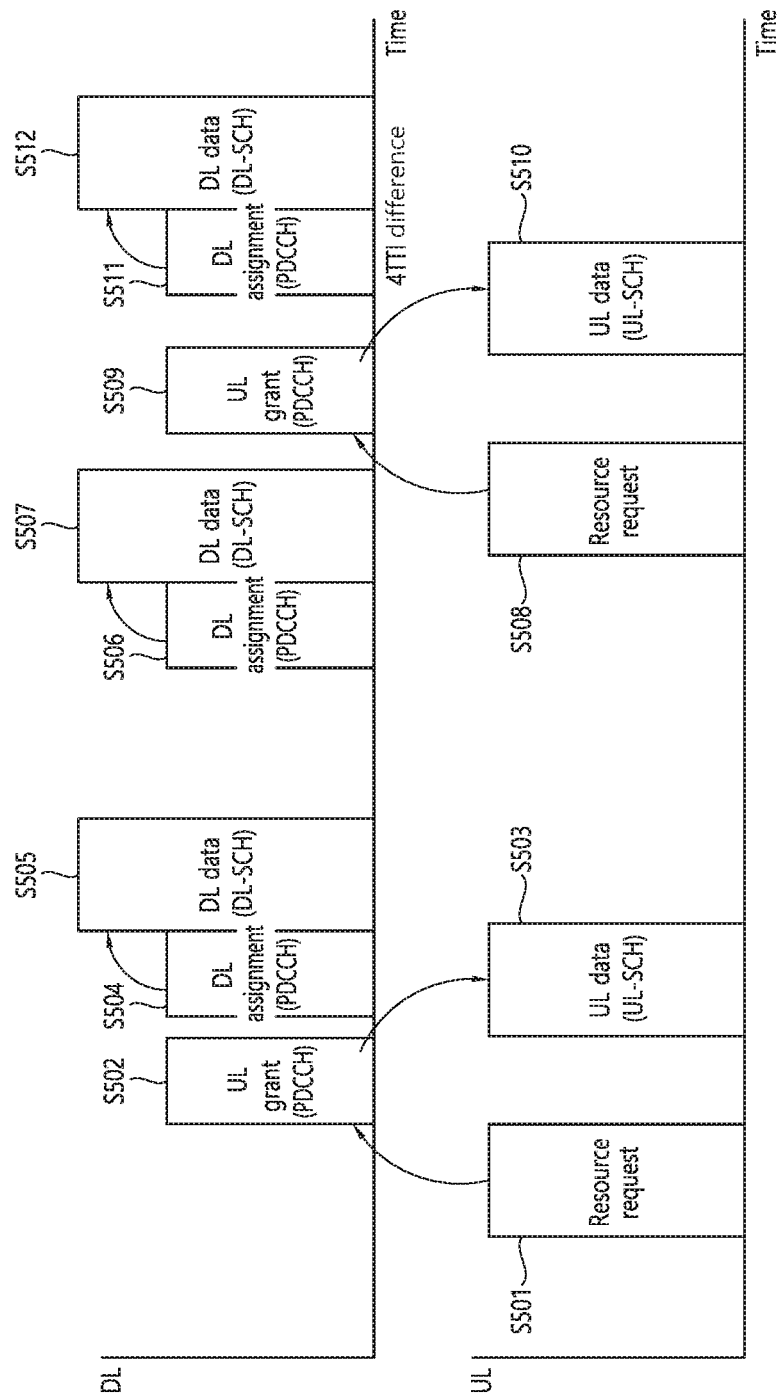
FIG. 5 is a drawing for explaining a method of dynamically assigning a radio resource.
Figure 6:
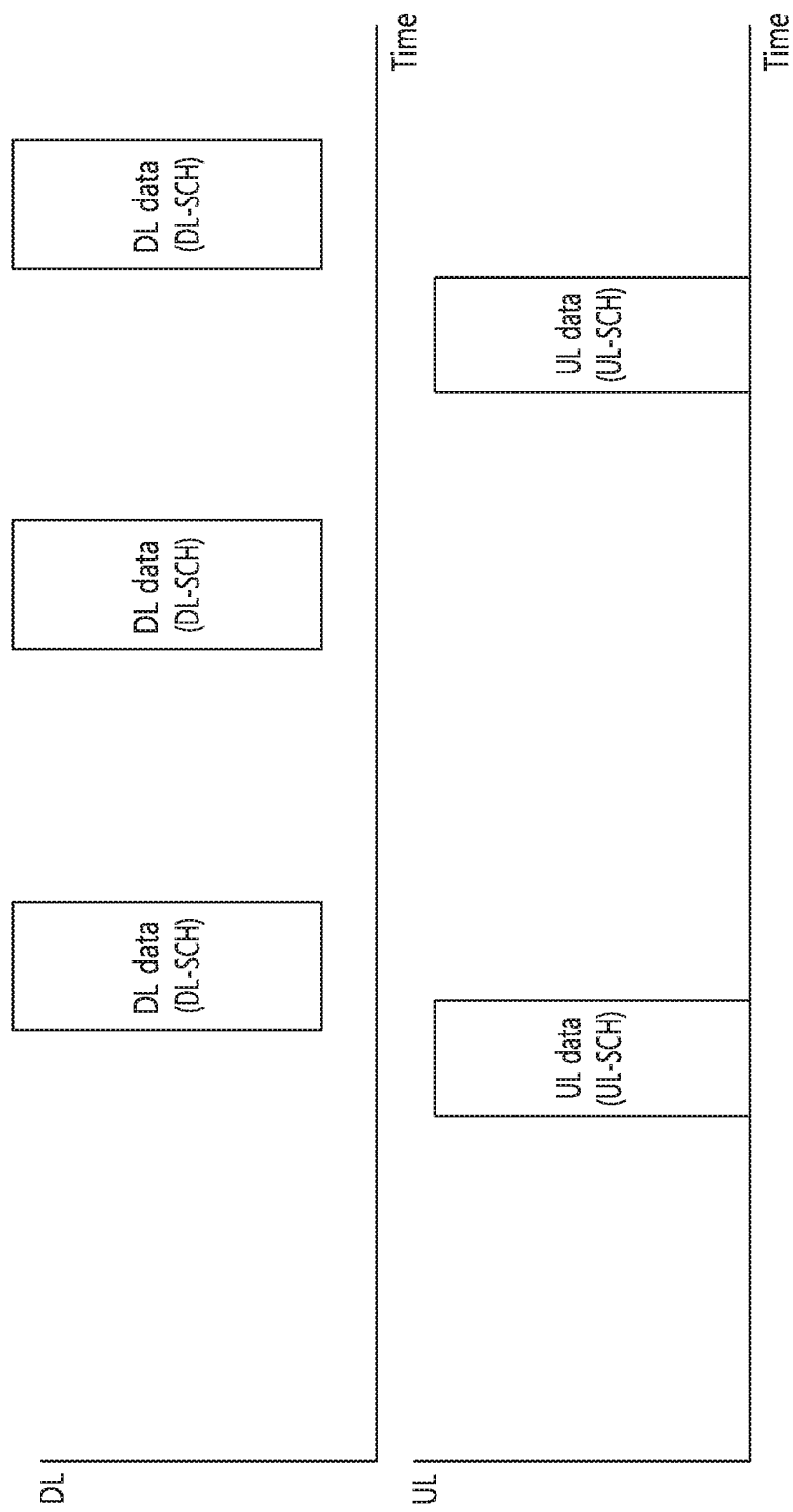
FIG. 6 is a drawing for explaining a semi-persistent scheduling (SPS) method.

FIG. 5 is a drawing for explaining a method of dynamically assigning a radio resource. FIG. 6 is a drawing for explaining an SPS method.

A typical process of transmitting data from a UE to an eNB (a method of dynamically assigning a radio resource) is described below with reference to FIG. 5. First, the UE may request the eNB to provide a radio resource required for transmission of generated data (S501). Therefore, the eNB may assign the radio resource through a control signal according to a radio resource request of the UE (S502). In an LTE system, the resource assignment of the eNB for transmitting UL data of the UE may be transmitted through a UL grant transmitted through a PDCCH. Therefore, the UE may transmit data to the eNB through the assigned radio resource (S503). The radio resource request of the UE, the resource assignment of the eNB, and corresponding UL data transmission of the UE may be optionally repeated (S508 to S510).

Meanwhile, when the eNB transmits downlink (DL) data to the UE, a DL assignment message may be transmitted to the UE through the PDCCH to know through which radio resource the data transmitted to the UE is transmitted (S504), and the eNB may transmit data to the UE through a radio resource corresponding to the DL assignment message (S505). In this case, DL assignment information transmission and DL data transmission through a radio resource corresponding thereto may be achieved in the same transmission time interval (TTI). Further, as shown in FIG. 5, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 6. That is, in the SPS method, the eNB does not have to transmit radio resource assignment information all the time through the PDCCH.

Hereinafter, a coordinated multi-point (CoMP) operation will be described in detail.

In the 3GPP LTE, the CoMP method for uplink or downlink may be broadly divided into two groups. Hereinafter, the CoMP method for downlink will only described for simplicity.

First, there is a multi-point coordination, which corresponds to a method wherein, although coordination (or adjustment), such as scheduling, link adaptation, and so on, may be performed between multiple transmission points, the transmission itself is performed from one specific transmission point. Additionally, there is also a multi-point transmission, which corresponds to a method wherein the transmission to one UE may be performed from multiple transmission point by using the CoMP method. The transmission may be dynamically performed between different transmission points by switching (or alternating) to and from one another. Alternatively, the transmission may be collectively performed from multiple transmission points.

More specifically, the multi-point coordination may coordinate the transmission from neighboring (or adjacent) transmission points in a scheduling viewpoint (whether or not to perform transmission or when to perform the transmission) or in a link adaptation viewpoint (at which rate the transmission is to be performed). However, it will be assumed that the transmission to a specific UE is still performed from only one specific transmission point.

Conversely in case of a multi-point transmission, the transmission to a specific UE may be performed from a plurality of transmission points each being different from one another. More specifically, the transmission points may be dynamically changed by using a dynamic point selection, or the transmission may be performed simultaneously from multiple transmission points by using a joint transmission method.

Hereinafter, the multi-point transmission will be described in more detail.

Figure 7:
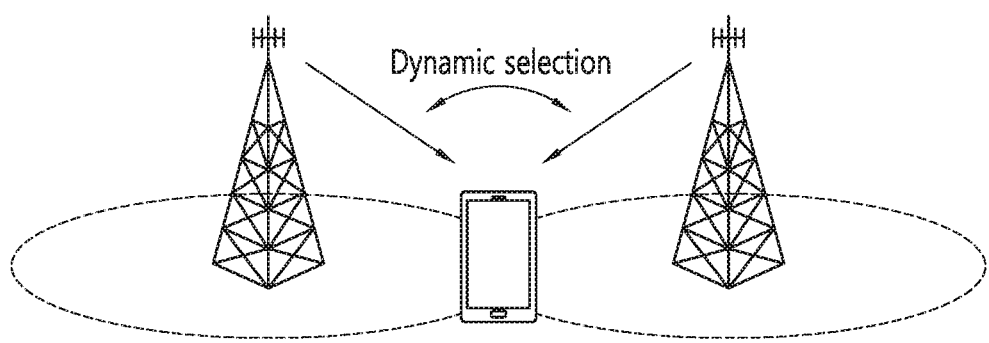
FIG. 7 is a diagram showing an example of performing a CoMP operation by using a dynamic point selection method between two transmission points.

FIG. 7 is a diagram showing an example of performing a CoMP operation by using a dynamic point selection method between two transmission points.

In the dynamic point selection method shown in FIG. 7, although the transmission is performed from a single transmission point, the corresponding transmission point may be dynamically changed.

In 3GPP LTE, all CoMP methods including the dynamic point selection method are performed based on the usage of Transmission Mode 10. Therefore, in the dynamic point selection method, channel estimation is performed through a DM-RS, and, as a result, the UE is no longer required to be informed (or aware) of the change in the transmission point. At this point, although the transmission corresponds to a simple PDSCH transmission, for the UE, when the transmission point is changed, the UE may regard such change as an abrupt change in the channel status. Essentially, for the UE, the operation may be performed identically as a case of beamforming using precoding that is not based on a codebook.

In order to assist on (or help) the dynamic point selection operation in the downlink, the UE shall provide a CSI report on the multiple transmission points. Similar to the link adaptation coordination and the scheduling coordination, the CSI report may be acquired by configuring a plurality of CSI processes in the UE.

In case of the link adaptation coordination and the scheduling coordination, CQI processes each being different from one another shall correspond to the same transmission point. In other words, a CSI-RS set should be identical for a plurality of different processors. Additionally, when making a decision on the transmission of adjacent transmission pints, different assumptions are applied so as to measure the interference. And, in order to perform the CSI report, the CSI-IM resource should vary for each of the plurality of processors.

Conversely, in order to support the dynamic point selection, different CSI processors shall respectively provide a CSI report corresponding to each of the transmission points. Therefore, the CSI-RS sets of the different processes shall be different from one another, and each of the CSI-RS sets shall correspond to different transmission points at which the dynamic point selection is being performed.

Figure 8:
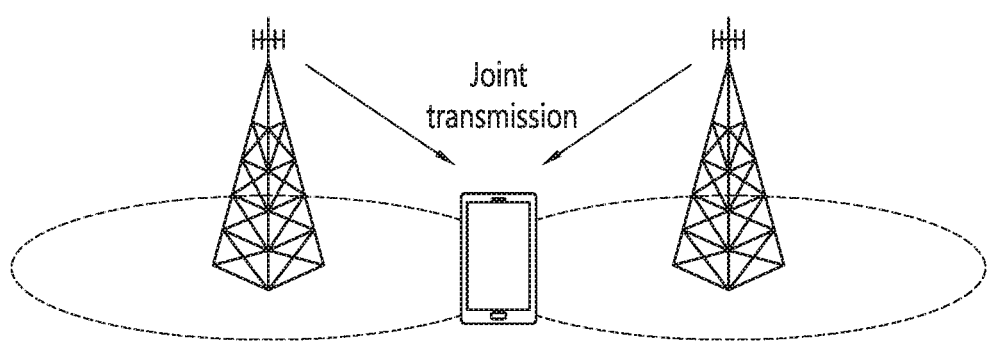
FIG. 8 is a diagram showing an example of performing a CoMP operation by using a joint transmission method between two transmission points.

FIG. 8 is a diagram showing an example of performing a CoMP operation by using a joint transmission method between two transmission points.

The joint transmission method shown in FIG. 8 represents a method wherein multiple transmission points perform transmission to the same UE at the same time. The joint transmission method may be divided into a coherent joint transmission and a non-coherent joint transmission.

In the coherent joint transmission, since the network is informed of detailed channel information from two or more transmission points, which are involved in the joint transmission, to the corresponding UE, the network may select a transmission weight (or transport weight) accordingly (e.g., the transmission weight may be selected to that the energy at the UE position can be maximized). Therefore, the coherent joint transmission may be regarded as a method wherein antennas participating in the beamforming correspond to each of the different transmission points instead of being positioned in one location.

Conversely, in the non-coherent joint transmission, it will be assumed that the network does not use the detailed channel information when performing the joint transmission. Therefore, the gain that is acquired from the non-coherent joint transmission corresponds to a power gain, which is simply obtained by adding the power of the multiple transmission points performing transmission to the UE. Such gain may vary depending upon whether or not it is more advantageous to use the power of the second transmission point when performing transmission for other UEs, or such gain may also vary depending a potential interference to another transmission that may exist in case the power of the second transmission point is additionally used in the same UE. Actually, in the non-coherent joint transmission, a gain may exist only in case the load within the network is low. This is because, in this case, another UE in which the power of the second transmission point is to be used may not exist. And, alternatively, additional interference that may occur when the power of the second transmission point is additionally used in the same UE may not cause a significant problem.

Figure 9:
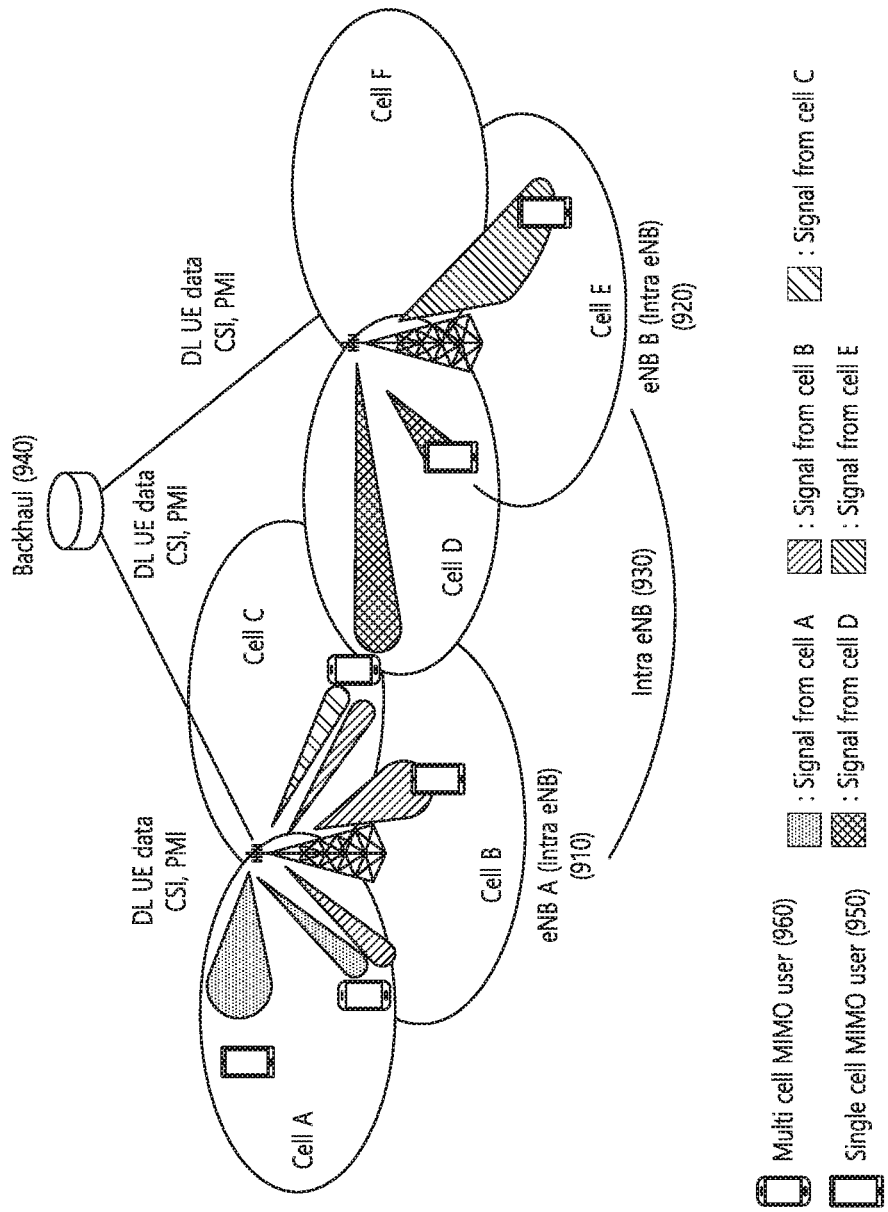
FIG. 9 is a diagram showing a procedure of performing a CoMP operation by an intra base station and an inter base station.

FIG. 9 is a diagram showing a procedure of performing a CoMP operation by an intra base station and an inter base station.

Referring to FIG. 9, intra base stations (or intra eNBs) (910, 920) and an inter base station (or inter eNB) (930) exist in a multi-cell environment. In LTE, the intra eNB is configured of a plurality of cells (or sectors). A cell that belongs to a base station (or eNB) to which a specific UE belongs is in a specific UE and an intra eNB (910, 920) relationship. In other words, a cell that shares the same eNB as a cell to which the UE belongs is referred to as a cell that corresponds to the intra eNB (910, 920), and a cell that belongs to another eNB is referred to as a cell that corresponds to the inter eNB (930). As described above, a cell that is based on a specific UE and the same base station (eNB) receives and transmits information (e.g., data, channel state information (CSI)) through an X2 interface, and so on. However, a cell that is based on another base station (eNB) may receive and transmit inter-cell information through a backhaul (940), and so on.

As shown in FIG. 9, a single cell MIMO user (950) existing within a single cell may perform communication with one serving base station in one cell (sector), and a multi-cell MIMO user (960) being positioned at a cell boundary may perform communication with multiple serving base stations within a multi-cell (sector).

Generally, under a multi-cell environment, when a method performing CoMP operations is used, the communication capability (or performance) of a cell boundary UE may be enhanced. Such method performing CoMP operations includes a Joint Processing (JP) method, which is configured of a coordinated MIMO format via data sharing, a Coordinated Scheduling/Coordinated Beamforming (CS/CB) method for reducing inter-cell interference, and so on. The Coordinated Scheduling/Coordinated Beamforming (CS/CB) method includes a worst companion method and a best companion method. Herein, the worst companion method corresponds to a method for eliminating (or cancelling) interference, wherein the UE performing CoMP operations reports a PMI having the largest interference on the cells, which perform the CoMP operations, to the serving base station, thereby allowing the corresponding cells to use a second (or next) best PMI excluding the reported PMI. And, the best companion method corresponds to a method for reducing inter-cell interference, wherein the UE performing CoMP operations reports a PMI having the smallest interference on the cells, which perform the CoMP operations, thereby allowing the inter-cell interference to be reduced by having the corresponding cells use the reported PMI.

As described above, the communication method performing CoMP operations is proposed in order to reduce inter-cell interference in a multi-cell environment and to enhance the capability of UEs positioned at cell boundaries. In order to do so, accurate channel estimation is required to be carried out based on reference signals received from multiple base stations. Most particularly, in case of using the method of performing CoMP operations, in order to allow the Coordinated Scheduling/Coordinated Beamforming (CS/CB) method as well as the Joint Processing (JP) method to be performed smoothly by a single feedback transmission, the UE is required to transmit signal intensity of a serving cell, signal intensity of a neighbor cell belonging to a group (or set) of cells performing CoMP operations, and intensity of noise and interference being generated from a cell other than the group (or set) of cells performing CoMP operations to the serving base station, and so on.

A cell boundary UE that performs the operations for performing the CoMP operations is required to transmit feedback information, which is needed to easily carry out the method for performing all CoMP operations (e.g., the Joint Processing (JP) method, the Coordinated Scheduling/Coordinated Beamforming (CS/CB) method, and so on) to the serving base station. When the UE transmits such feedback information, the overhead according to the complicated signaling may be reduced, and the UE and each cell performing the CoMP operations may be capable of efficiently performing diverse CoMP operations. In order to support this, the UE measures a CQI value between multiple cells and may send feedback related to the measured value to the serving base station, and so on.

The UE performing the CoMP operations may measure adequate CQI values corresponding not only to the serving cell performing the CoMP operations but also to the neighbor cells providing interference or preferable signals. And, then, the UE may send feedback on the measured values. Based on such CQI values, the serving base station may carry out a method for performing diverse CoMP operations. For this, the UE is required to measure the signal intensity of a serving cell, the signal intensity of a neighbor cell belonging to a group (or set) of cells performing CoMP operations, and the intensity of noise and interference being generated from a cell other than the group (or set) of cells performing CoMP operations and then transmit the measured values to the serving base station. If the UE is capable of measuring such values and sending feedback on such values to the serving base station, the serving base station may accurately calculate the CQI values not only for Coordinated Scheduling/Coordinated Beamforming (CS/CB) method but also for the Joint Processing (JP) method and may then perform optimal transmission.

The current cellular system is evolving from the fourth generation (4G) to the fifth generation (5G). In the usage of the 5$^{th}$ generation communication, in addition to the evolution of the legacy smartphone-based mobile broadband services, requirements for supporting diverse Internet of Things (IoT) application services, such as healthcare, disaster management, vehicle communication, factory management, robot control, and so on, are being defined. In supporting the IoT application services, the issue of transmitting highly reliable data within a short period of time is becoming more important than the data rate, which was considered to be very important in the legacy communication system. Such type of service is referred to as an Ultra-Reliable Low Latency Communication (URLLC) in the 3GPP.

Hereinafter, the manifold transmission will be described in detail. The manifold transmission method corresponds to a method that maximizes the number of transmission sessions and diversity within a limited time by using multiple paths. The manifold transmission may also be referred to as a multi-path transmission or a manifold transmission. Hereinafter, the above-mentioned terms will be alternately used for describing the manifold transmission (or multiple transmission).

Figure 10:
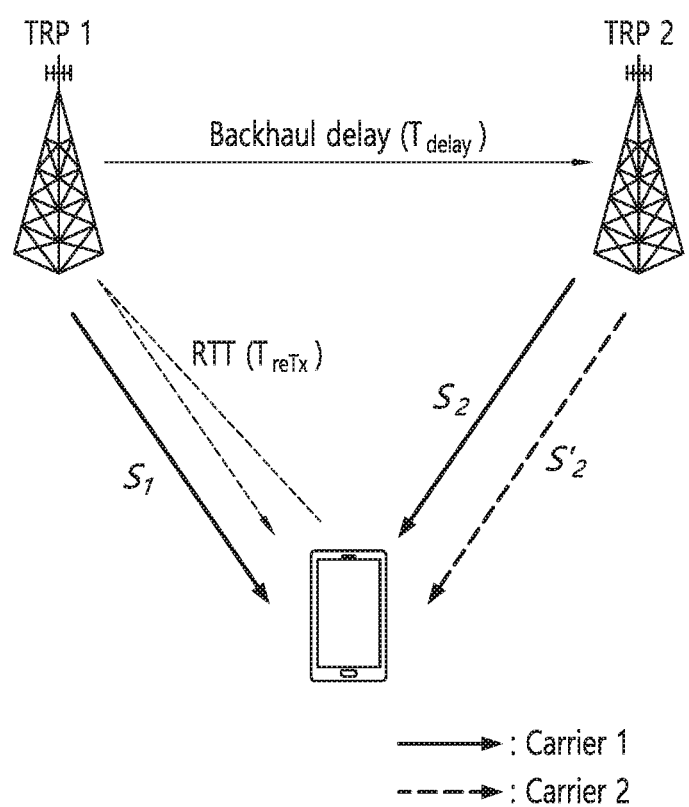
FIG. 10 is a diagram showing a comparison between a manifold transmission method and a CoMP operation according to an exemplary embodiment of this specification.

FIG. 10 is a diagram showing a comparison between a manifold transmission method and a CoMP operation according to an exemplary embodiment of this specification.

When the manifold transmission method of FIG. 10 is used, it is advantageous in that the transmission is more robust against backhaul delay (or latency) as compared to the legacy CoMP method, and that a larger number of transmission sessions can be performed within a limited time. In the next generation wireless communication system, the manifold transmission method uses a two level DCI. When performing physical layer scheduling, in the conventional method, the scheduling process was performed in a single level (or phase), which is configured of PDCCH, and so on, whereas, in the manifold transmission method, the two level DCI attempts to perform scheduling by using level 1 DCI and level 2 DCI, respectively. More specifically, in level 1 DCI, scheduling is performed for a manifold transmission activation indicator, and, in level 2 DCI, each TRP performs scheduling for the data (packet).

Additionally, in the legacy CoMP method, TRP 1 and TRP 2 perform scheduling after establishing coordination, whereas, in the manifold transmission method, TRP 1 and TRP 2 may perform scheduling freely. In case of the UE, the UE receives signal $S_1$, which is transmitted from TRP 1, and receives signal $S_2$, which is transmitted from TRP 2, as a retransmitted signal. In FIG. 10, Sx corresponds to a signal that is transmitted from TRP x and generated from the same information.

Table 1 shown below represents a comparison between signals being transmission by using the manifold transmission method and the legacy CoMP method within a limited time.

TABLE 1

| Time | t | t + $T_{delay}$ | t + $T_{reTx}$ | t + $T_{delay}$ + $T_{reTx}$ | t + 2$T_{delay}$ + $T_{reTx}$ |
|---|---|---|---|---|---|
| CoMP JT case 1 | $S_1$, $S_2$ | | | $S_1$ or $S_2$ | |
| CoMP JT case 2 | $S_1$, $S_2$ | | | | $S_1$, $S_2$ |
| Manifold Tx | $S_1$ | $S_2$ and/or $S'_2$ | $S_1$ | $S_2$ and/or $S'_2$ | |

In order to differentiate the signals, in Table 1, $S_1$ and $S_2$ represent signals being transmitted from Carrier 1, and $S'_2$ represents a signal being transmitted from Carrier 2.

Referring to Table 1, in the manifold transmission method, since the signal being transmitted equally corresponds to $S_1$ for both of a case where the limited time is equal to t and a case where the limited time is equal to t+$T_{reTx}$, it will be apparent that the transmission is not influenced by the backhaul delay (or latency). Additionally, in the manifold transmission method, since the signal being transmitted equally corresponds to $S_2$ and/or $S'_2$ for both of a case where the limited time is equal to $t+T_{delay}$ and a case where the limited time is equal to $t+T_{delay}+T_{reTx}$, it will be apparent that replicated transmission is possible in another TRP or another numerology or another carrier or another Radio Access Technology (RAT).

Although this specification is described by using a transmission and reception point (TRP), this specification will not be limited only to this. And, therefore, this specification may also be applied to any other similar device (or apparatus). For example, it will be possible to replace the TRP of this specification with a cell, a base station (eNB), a transmission point, an access point (AP), a radio unit, and so on.

In this specification, the UE may receive signals from a primary TRP and one or more secondary TRPs, and, for this, the primary TRP and the secondary TRP(s) are in a synchronized state. The primary TRP and the secondary TRP may use the same carrier or may each use a different carrier. Alternatively, the primary TRP and the secondary TRP may each correspond to a different RAT or may each have a different numerology. In case each of the primary TRP and the secondary TRP uses a different carrier, the primary TRP and the secondary TRP may physically correspond to the same device (or apparatus).

A numerology may correspond to diverse numeric values that can be used in a next generation communication system, which is used for the purpose of high reliability and low latency (or delay). For example, a numerology may correspond to a length of a subframe (TTI length), subcarrier spacing, a number of symbols in a subframe, and/or a CP length, and so on.

Additionally, a self-contained frame may be used in the wireless communication system that is proposed in this specification. Hereinafter, the self-contained frame will be described in detail.

Figure 11:
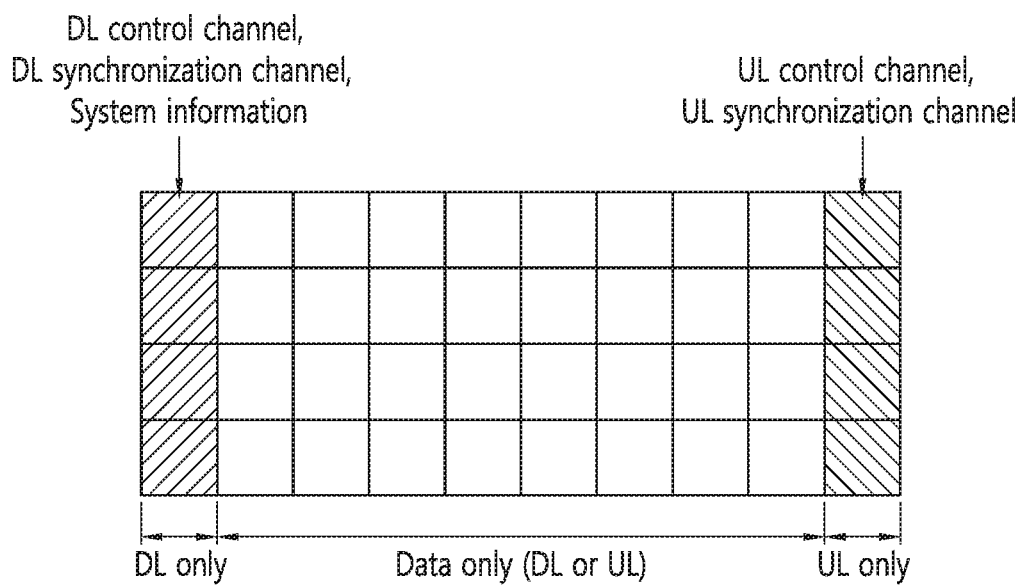
FIG. 11 shows an exemplary structure of a self-contained frame in a TDD communication system according to an exemplary embodiment of this specification.

FIG. 11 shows an exemplary structure of a self-contained frame in a TDD communication system according to an exemplary embodiment of this specification.

A data transmission delay (or latency) of 1 ms may be proposed as a low delay (or low latency) requirement of the next generation wireless communication system. In order to ensure a data transmission delay of 1 ms, a structure of a self-contained frame in which a downlink control channel and an uplink control channel always exist is being proposed. As shown in FIG. 11, in the structure of a self-contained frame, a control channel and a data channel are time-divided. In other words, the control channel and the data channel may be positioned by using the TDM method.

In the legacy LTE system, an uplink control channel and an uplink data channel are frequency-divided. Therefore, there were limitations in estimating the channel characteristics of an uplink data channel by using a reference signal of an uplink control channel. However, in a self-contained frame structure, since the uplink control channel and the uplink data channel are time-divided, it is possible to estimate the channel quality of the data channel by using a reference signal of the control channel. In order to perform channel estimation by using this characteristic, a method (or technique) of hopping the control channel has been proposed (Method of UL signal transmission for UL channel sounding). Additionally, since the downlink data channel and the uplink control channel are time-divided, it is possible to estimate the quality of the uplink control channel and the uplink data channel by using the quality information of the downlink channel. More specifically, when the above-described method is applied, the inter-channel similarity between the uplink control channel and the downlink data channel is increased due to the characteristic of channel reciprocity. It is possible to perform channel estimation for the uplink data transmission by using a reference signal of the uplink control channel.

FIG. 12 shows an exemplary structure of a self-contained frame in an FDD communication system according to an exemplary embodiment of this specification.

The self-contained frame structure is a frame structure that is designed for the TDD communication system. However, in order to reduce unnecessary (or redundant) overhead in a communication network supporting both the FDD and the TDD, the frame structures of the FDD and TDD may be shown to have similar structures. More specifically, as shown in FIG. 12, in the structure of a self-contained frame, a DL frame and a UL frame may be positioned in a frequency-division format. In a DL frame, the downlink control channel and data channel may be positioned in a time-division format, and, in a UL frame, the data channel and the uplink control channel may be positioned in a time-division format.

This specification proposes a Semi-Persistent Scheduling (SPS) (or Semi-Dynamic Scheduling) resource allocation method (or technique) for performing manifold transmission in a synchronization network. When using this method (or technique), it will be advantageous in that the UE (or device) operation becomes more simplified.

However, since a user equipment (UE), which is in a state of receiving signals from multiple TRPs, matches the synchronization with multiple TRPs and receives the signals from the multiple TRPs, it is disadvantageous in that the UE operation becomes complicated. In case the TRPs within the network are not synchronized, the UE should have Rx chains matching each TRP in order to be in synchronization with each of the TRPs. In this case, the UE may be dynamically scheduled and the scheduling of the TRPs may be highly flexible. However, it may be disadvantageous in that the manifold transmission may be performed only as much as the number of Rx chains.

Nevertheless, since the proposed method (or technique) assumes a situation where the synchronization of the TRPs within the network match, the UE operation is simplified because the UE is required to receive only one synchronization signal. Therefore, this specification proposes a manifold transmission method in a situation where the synchronization of the TRPs within the network is achieved.

Figure 13:
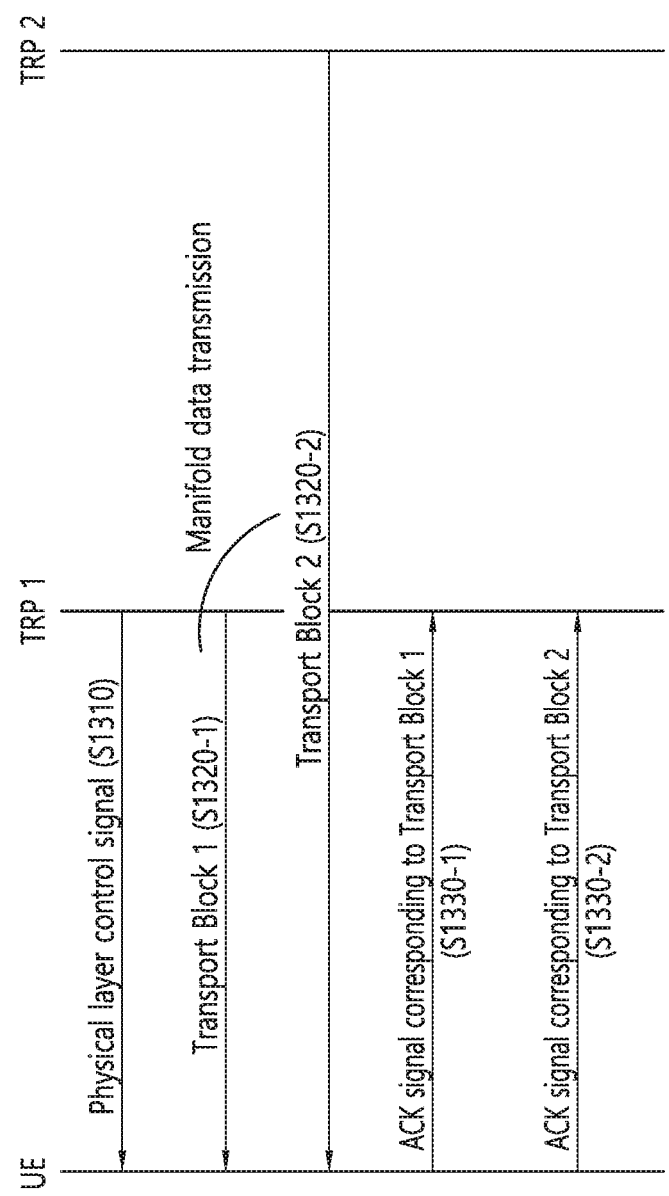
FIG. 13 shows an example of performing manifold transmission in a situation where synchronization of TRPs is coherent within a network according to an exemplary embodiment of this specification.

FIG. 13 shows an example of performing manifold transmission in a situation where synchronization of TRPs is coherent within a network according to an exemplary embodiment of this specification.

FIG. 13 shows an exemplary manifold transmission procedure of Proposed Technique 1, which will hereinafter be described in detail. TRP 1 of FIG. 13 may correspond to a primary TRP, and TRP 2 of FIG. 13 may correspond to a secondary TRP. TRP 1 and TRP 2 may belong to a TRP group applying the manifold transmission method.

—Proposed Technique 1—

For example, in order to transmit M number of transport blocks (TBs), the primary TRP allocates manifold transmission resources (resources for manifold transmission) to the UE during N number of subframes (S1310). Manifold transmission resources are released (or cancelled) when the primary TRP receives ACKs for M number of transport blocks (S1330-1, S1330-2). During the N number of subframes, in addition to the primary TRP, secondary TRPs may also transmit transport blocks to the UE, and the UE is not required to acknowledge from which TRP the received signal is being transmitted. Therefore, the primary TRP and the secondary TRPs use the same reference signal (e.g., DMRS) for transmitting transport blocks to the UE (S1320-1, S1320-2). Herein, M and N are integers each being equal to or greater than 1, and the value N may be configured without limit.

More specifically, in this specification, the primary TRP allocates manifold transmission resources in units of TRP groups supporting manifold transmission. Since the TRPs within the network are all synchronized, a specific resource may be configured in order to allow multi-cells to perform manifold transmission. More specifically, manifold transmission resources are allocated for TRPs within the TRP group by using the SPS method. Therefore, even if the primary TRP transmits a control signal only once, the TRP within the TRP group may use the manifold transmission resource. Additionally, since the UE does not know which TRP is transmitting the signal, if the manifold transmission resources are configured, the primary TRP as well as the secondary TRPs may be capable of transmitting signals freely.

Unlike in the legacy CoMP method, in the manifold transmission method, each TRP may respectively transmit a signal without establishing any cooperation between the TRPs within the TRP group. More specifically, if the primary TRP provides only the information on the number of transport blocks (or MAC packets) and the information on the time during which the manifold transmission can be performed, each of the primary TRP and the secondary TRPs may transmit a transport block to the UE without establishing any cooperation between one another. The UE may receive each of the transport blocks respectively transmitted from each of the primary TRP and the second TRPs as though the corresponding transport blocks have been retransmitted. Accordingly, the UE requires a retransmission process IP (PCID).

Figure 14:
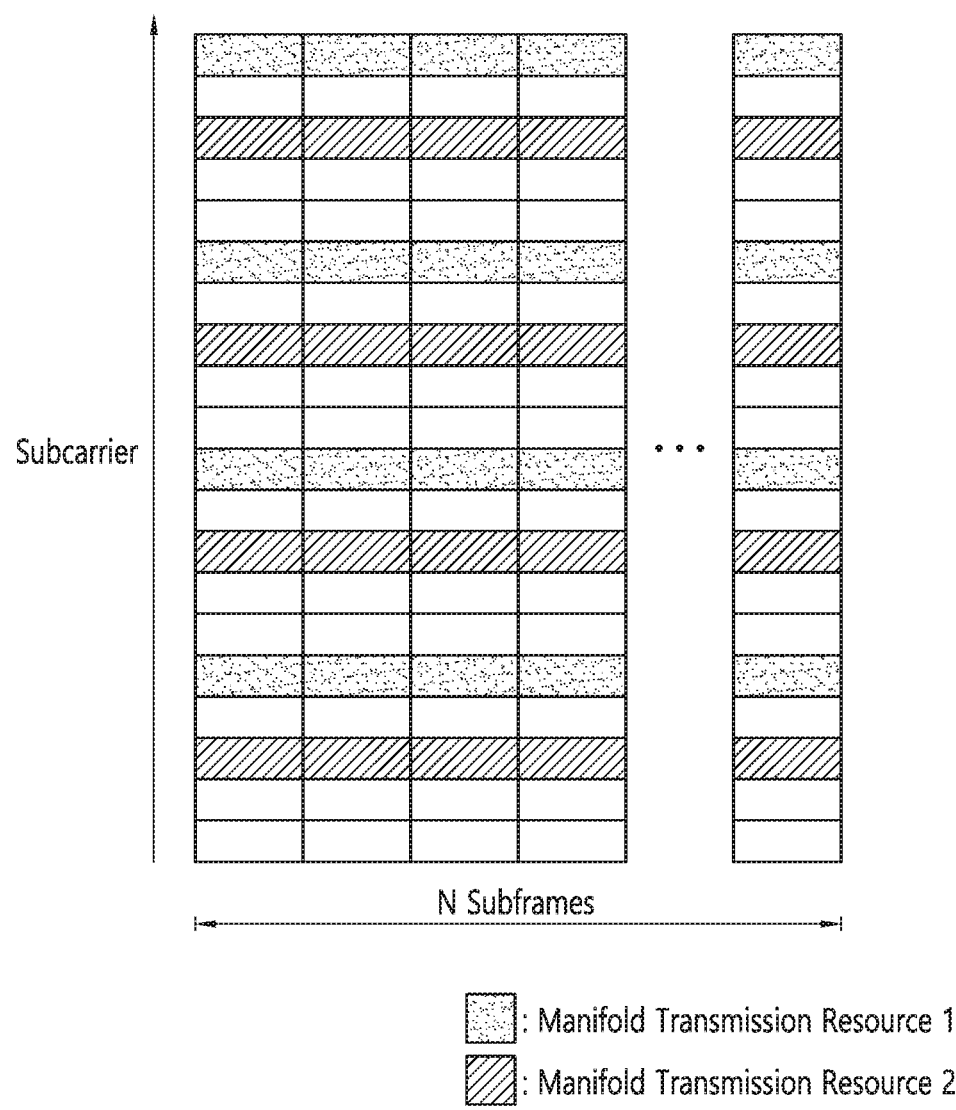
FIG. 14 shows an example of configuring manifold transmission resources according to an exemplary embodiment of this specification.

FIG. 14 shows an example of configuring manifold transmission resources according to an exemplary embodiment of this specification.

The manifold transmission resource that is allocated to the UE by the TRP corresponds to a logical resource. The corresponding logical resource may be mapped to a physical resource, which is configured by using a subcarrier that is distributed in order to achieve a frequency gain, as shown in FIG. 14. Referring to FIG. 14, the UE may first be allocated with Manifold Transmission Resource 1 and may then be additionally allocated with Manifold Transmission Resource 2. Both Manifold Transmission Resource 1 and Manifold Transmission Resource 2 may be allocated to the UE by being distributed to a subcarrier band by using different subcarrier resources.

In this specification, it is assumed that the primary TRP transmits a manifold transmission indicator only once. In case M=1, the primary TRP may not transmit a physical layer control signal during N number of subframes. This has an effect of reducing a number of transmission sessions for transmitting control signals to a downlink physical control channel (e.g., PDCCH). Therefore, even if a significantly low code rate is used when a high-reliability physical control signal is transmitted, in an average point of view, this may have an effect of reducing resources of a control channel that is occupied by the high-reliability control signal.

Additionally, the base station (TRP) may activate the manifold transmission while transmitting a physical layer control signal to the UE and may then be capable of allocating manifold transmission resources during N number of subframes. Moreover, at the same time, the base station (TRP) may designate a reference signal (e.g., DMRS) that is to be used when performing signal reception, a symbol modulation method of a first transport block, a code rate of a channel code, and a retransmission process ID. Starting from a second transport block, only the symbol modulation method of the second transport block, the code rate of a channel code, and so on, may be separately transmitted.

Assumed herein is a case where a length N during which resource allocation is continued, when the manifold transmission is activated in advance by the TRP, and a mapping method of a manifold transmission logical resource are received. The UE that has received a manifold transmission activation indicator may determine that the corresponding resource is configured for the manifold transmission during length N (N number of subframes) through the received indicator.

Since the object of this exemplary embodiment is to enable the UE to receive a signal, even if it does not know from which TRP the corresponding signal is being transmitted, the TRPs within the group transmit signals by using the same reference signal. In order to achieve the effect of having the signals, which are transmitted by each of the TRPs, be automatically combined in the UE (receiving end), each TRP needs to determine the channel characteristic between the TRP itself and the UE. If the TRP is unable to determine the channel, a gain resulting from an increase in the power may be simply achieved.

Since the UE receives a signal for performing scheduling for a single transmission block only once, each of the TRPs shall transmit a signal by using the same modulation method and code rate for the same transport block.

Additionally, for a case when M is greater than 1, the number of transport blocks that are to be transmitted from the manifold transmission resource is notified. For this, by notifying the number of process IDs that are to be used during the N number of subframes, the TRP may deliver the number of transport blocks to the UE. This is because, for the UE, each of the transport blocks is received as though each of the TBs is retransmitted from the TRPs within the TRP group.

FIG. 15 shows an example of positioning OFDM symbols for data transmission in a self-contained frame structure according to an exemplary embodiment of this specification.

Additionally, the TRP may explicitly notify the number of OFDM symbols that may be used for the data transmission within a subframe. The TRPs within the TRP group transmit transport blocks by using only the OFDM symbols that can be used for the data transmission.

Since each of the TRPs uses the same modulation method and code rate, the resources of the data channel being transmitted by each of the TRPs should be identical. If the resources of the data channel being transmitted by each of the TRPs are not identical, a change may occur in the code rate by rate matching. In order to prevent such change from occurring, it is required to designate the number of OFDM symbols within a subframe that is to be used when the TRPs within the TRP group transmit data applying the manifold transmission.

FIG. 15 shows an example of positioning OFDM symbols in a downlink transmission and an uplink transmission in a case where the number of OFDM symbols for the data transmission is configured to be equal to 10. Referring to FIG. 15, if the UE acknowledges that the number of OFDM symbols for the data transmission is equal to 10, in the downlink transmission, the downlink control channel may be positioned for the first two OFDM symbols, and the uplink control channel may be positioned for the last OFDM symbol, and a guard period having the same length as one OFDM symbol may be positioned between the data channel and the uplink control channel. Additionally, in the uplink transmission, the downlink control channel may be positioned for the first OFDM symbol, and the uplink control channel may be positioned for the last two OFDM symbols, and a guard period having the same length as one OFDM symbol may be positioned between the downlink control channel and the data channel.

Additionally, the number of OFDM symbols that may be used for the data transmission within a subframe may also be implicitly notified. In the first subframe, the primary TRP may transmit a downlink control signal by using L_DL number of OFDM symbols and may receive an uplink control signal by using L_UL number of OFDM symbols. In case the number of symbols within a subframe is equal to L_sub, the number of OFDM symbols that can be used for the data transmission by the TRPs performing the manifold transmission including the guard period corresponds to L_sub-L_DL-L_UL-1. The above-described exemplary embodiment corresponds to a method of limiting the number of symbols in a data channel being used for the data transmission by using the number of symbols in the downlink control channel and the uplink control channel of the primary TRP. Although the exemplary embodiment of this specification achieves an effect of reducing physical layer signaling, it also has a disadvantage of requiring secondary TRPs to match their number of symbols in the control channel with that of the primary TRP.

FIG. 15 merely illustrates one exemplary embodiment of this specification. And, therefore, this specification will not be limited to the exemplary embodiment presented herein. Accordingly, OFDM symbols for data transmission in a self-contained frame structure may be diversely positioned.

Additionally, the UE that has already been allocated with resources during N number of subframes for M number of transport blocks may be newly allocated with resources during N number of subframes for M' number of transport blocks. In this case, the resources that are allocated for the new transport block may be allocated by using subcarrier resources that are different from the resources that have already been allocated earlier.

A case where a UE, which is currently receiving a transport block including high-reliability data for the manifold transmission, is required to newly receive a transport block including high-reliability data may occur. If the new data is put on hold (or stand-by) in order to receive the previous data, the new data may not be delivered to the UE within the target time. Therefore, it is preferable to enable the UE to be additionally allocated with manifold transmission resources. For example, as shown in FIG. 14, the UE, which is currently performing manifold transmission after being allocated with Manifold Transmission Resource 1, may be additionally allocated with Manifold Transmission Resource 2.

Additionally, in case a logical resource for the manifold transmission is allocated by using the above-described method, the process ID is valid only in the corresponding logical resource. More specifically, as shown in the above-described exemplary embodiment, in case a logical resource for the manifold transmission is newly allocated, a new process ID is applied.

In this exemplary embodiment, in order to apply the manifold transmission technique, the logical resource for the manifold transmission is activated during N number of subframes. At this point, M number of transport blocks may be transmitted only from the manifold transmission resource. Therefore, by re-using the process ID in accordance with the manifold transmission resource, an overhead of a physical layer control signal for expressing the process ID may be reduced. For example, the UE, which has been allocated with Process ID 1 to Process ID 4 in order to receive four transport blocks from Manifold Transmission Resource 1, may be re-allocated with Process ID 1 and Process ID 2 in order to receive two transport blocks from Manifold Transmission Resource 2. The UE differentiates the process IDs from one another in accordance with the index of the manifold transmission resource that has received its transport block.

Additionally, the UE that has received M number of transport blocks from one manifold transmission resource is allocated with M number of ACK/NACK resources for the M number of transport blocks. More specifically, the number of ACK/NACK resources increases in accordance with the number of process IDs, which are allocated to the UE.

Since the UE may receive a signal from each TRP, the UE may receive Transport Block 1 from the primary TRP. And, then, the UE may receive Transport Block 2 from a secondary TRP before transmitting an ACK for the reception of Transport Block 1. Since the primary TRP cannot accurately know the point where the secondary TRP has transmitted Transport Block 2, the primary TRP may retransmit Transport Block 2 without determining whether or not the UE has successfully received Transport Block 2. Therefore, since the UE is required to notify the primary TRP that is has successfully received Transport Block 2, it is required to allocate different ACK/NACK resources to each of the transport blocks.

At this point, the ACK/NACK resources for the transport blocks applying the manifold transmission method that are allocated to the UE are determined in accordance with the index of the corresponding manifold transmission resources and process ID. Since the M number of transport blocks are allocated to the same resource, it is difficult to differentiate (or identify) the ACK/NACK resources by using only the transmission resource. Therefore, it is required to use the process ID. Additionally, in the manifold transmission, since the downlink control signal for the M number of transport blocks may be transmitted only once, it is difficult to configure the ACK/NACK resources in accordance with the transmission position of the downlink control signal (DL grant). Therefore, an ACK/NACK resource is determined in accordance with not only the index of the manifold transmission resource but also the process ID.

An N value, which corresponds to a maximum length of a manifold transmission resource, and a mapping relationship between a logical resource and a physical resource of the manifold transmission are transmitted in advance to the UE by the base station via L2/L3 signaling. If the manifold transmission is activated, the base station indicates one of the logical resources to the UE via L1 signaling. And, once the UE receives the indicated logical resource, the UE activates the manifold transmission resources during N number of subframes. When the above-described method is used, signaling overhead, which is used when the base station indicates a manifold transmission resource to the UE via L1 signaling, may be reduced. Additionally, the positioning format of the physical resources may be configured to have a format that maximizes frequency diversity by allocating the physical resources to the subcarrier band in a distributed format, as shown in FIG. 14.

When performing the manifold transmission, the TRPs within the TRP group transmit data by using the same UE temporary identifier (e.g., Cell-Radio Network Temporary Identifier (C-RNTI)). Since the UE cannot determine which TRP has transmitted the signal during the N number of subframes, the TRPs within the TRP group are required to transmit signals by using the same RNTI.

Additionally, the TRPs within the TRP group transmit the reference signal to the UE by using reference signals for channel estimation that are orthogonal to one another (e.g., Channel State Information-Reference Signal (CSI-RS)). The UE that has received the reference signal responds to the primary TRP by separately estimating the channels for each reference signal.

Since the object of the proposed method (or technique) is to enable the UE to receive a signal even though the UE does not know from which TRP the corresponding signal is being transmitted, in order to achieve an effect of having the signals that are transmitted from each TRP to be combined in the UE (receiving end) in a situation where the same reference signal is allocated, each TRP is required to transmit a signal by applying pre-coding or beamforming that best fits the current situation. For this, since each TRP is required to determine the channel characteristic between the TRP itself and the UE, the reference signal for channel estimation should be designed so that the TRPs can be orthogonal to one another.

Figure 16:
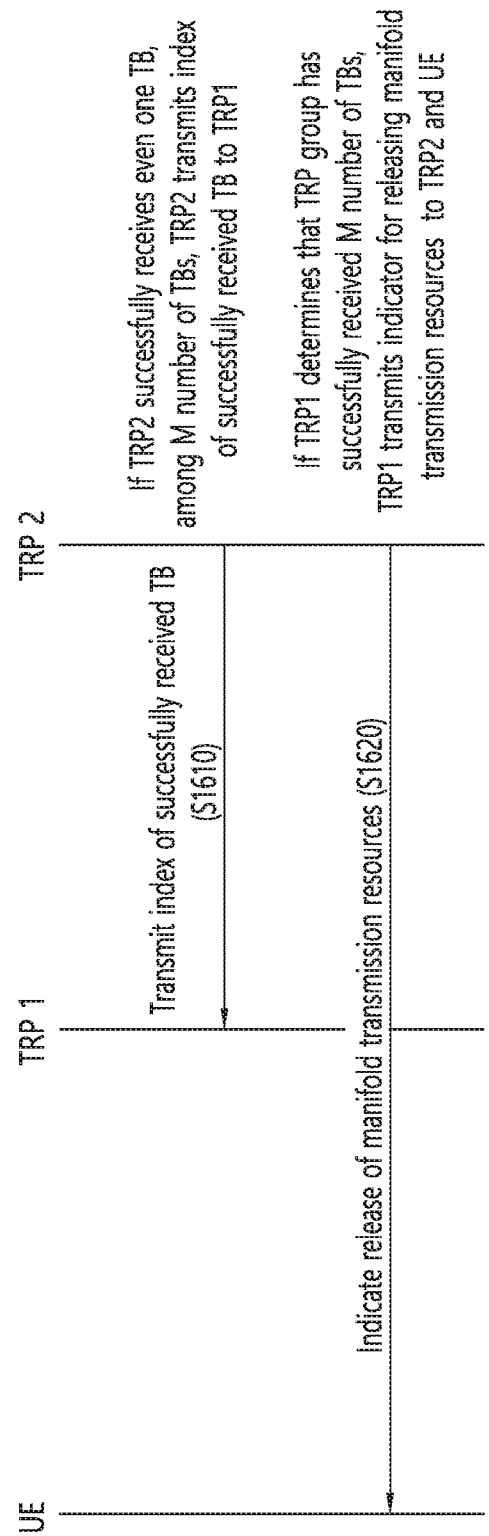
FIG. 16 shows an example of a release procedure of an uplink manifold transmission resource according to an exemplary embodiment of this specification.

FIG. 16 shows an example of a release procedure of an uplink manifold transmission resource according to an exemplary embodiment of this specification.

FIG. 16 shows an exemplary manifold transmission procedure of Proposed Technique 2, which will hereinafter be described in detail. Unlike the Proposed Technique 1, which assumes downlink transmission, the Proposed Technique 2 describes a manifold transmission method applying an uplink transmission. TRP 1 of FIG. 16 may correspond to a primary TRP, and TRP 2 of FIG. 16 may correspond to a secondary TRP. TRP 1 and TRP 2 may belong to a TRP group applying the manifold transmission method.

—Proposed Technique 2—

For example, in order to receive M number of transport blocks, the primary TRP may allocate manifold transmission resources to the UE during N number of subframes. The manifold transmission resources are released (or cancelled) when the UE receives a release indicator from the primary TRP. The primary TRP transmits a release indicator to the UE when a sum of the number of transport blocks received by the primary TRP and the number of different transport blocks received from each of the secondary TRPs is equal to M (S1620). Although the UE regards the primary TRP as the receiving end during N number of subframes and transmits an uplink signal, the secondary TRPs also attempt to perform decoding of the uplink signal, which is transmitted from the UE. Herein, M and N are integers each being equal to or greater than 1, and the value N may be configured without limit.

In the uplink transmission, since the TRPs decode the signals, the primary TRP needs to receive indexes of the transport blocks, which each TRP within the TRP group has successfully received (S1610). For example, if M=2, and in case the primary TRP has successfully received Transport Block 1 and a secondary TRP has successfully received Transport Block 2, the secondary TRP may notify the primary TRP that it has successfully received Transport Block 2 (S1610). After receiving such notification, the primary TRP releases (or cancels) the uplink resource for the manifold transmission and notifies such release to the secondary TRP (S1620).

Additionally, instead of explicitly releasing the manifold transmission resources for the M number of transport blocks, the UE may also release the manifold transmission resources, when the UE receives M number of ACKs for the M number of transport blocks. More specifically, the primary TRP (base station) does not explicitly transmit any release indicator for the manifold transmission resources to the UE. Instead, the base station may release the manifold transmission resources by using the ACK, which is transmitted from the base station to the UE. More specifically, when the UE receives all ACKs for the M number of transport blocks, which the UE has transmitted, from the TRP (base station), the UE automatically releases the manifold transmission resources.

Additionally, as described above in the Proposed Technique 1, in case logical resources are allocated for the uplink manifold transmission, the process ID is only valid in the corresponding logical resource. More specifically, in case logical resources are newly allocated for the uplink manifold transmission, a new process ID is applied. In other words, if the manifold transmission resources for the uplink transmission are different, the UE reconfigures the process ID. This has an effect of reducing the number of bits that are used by the physical layer control signal for expressing the process ID.

Furthermore, when compared with the Proposed Technique 1, since the only difference between the Proposed Technique 1 and the Proposed Technique 2 relates to whether the transmission corresponds to a downlink transmission or an uplink transmission, the method (or technique) that is described in the Proposed Technique 1 may also be applied in the Proposed Technique 2.

Figure 17:
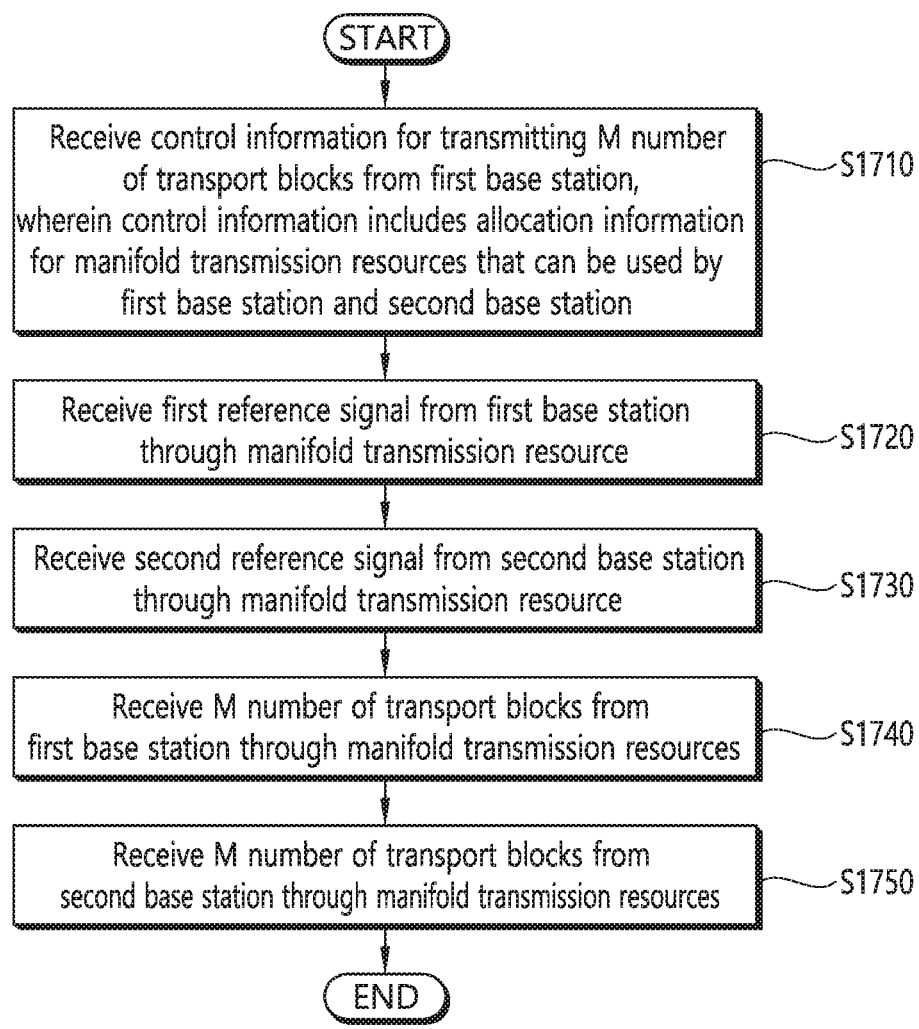
FIG. 17 is a flow chart showing a procedure for receiving a signal in a wireless communication system applying a manifold transmission technique according to an exemplary embodiment of this specification.

FIG. 17 is a flow chart showing a procedure for receiving a signal in a wireless communication system applying a manifold transmission technique according to an exemplary embodiment of this specification.

The terms will first be described. A manifold transmission (or multiple transmission) method (or technique) refers to a technique for maximizing the number of signal transmission sessions and diversity within a limited time by using multiple paths. The manifold transmission may also be referred to multi-path transmission or manifold transmission. A first base station may correspond to the primary TRP, and a second base station may correspond to the secondary TRP. In this specification, a subframe may be replaced with a slot.

Firstly, in step S1210, a user equipment (UE) receives control information for transmitting M number of transport blocks from a first base station. The control information includes allocation information for manifold transmission resources that may be used by the first base station and a second base station during a predetermined subframe. Since the value M is an integer being equal to or greater than 1, one transport block may be used, or a plurality of transport blocks may be used. Unlike in the legacy CoMP method, in the manifold transmission method, each base station may respectively transmit a signal without establishing any cooperation between the base stations.

In step S1220, the UE receives a first reference signal from the first base station through the manifold transmission resources. In step S1230, the UE receives a second reference signal from the second base station through the manifold transmission resources. The first reference signal and the second reference signal are identical to one another.

In step S1240, the UE receives the M number of transport blocks from the first base station through the manifold transmission resources. In step S1250, the UE receives the M number of transport blocks from the second base station through the manifold transmission resources. At this point, the M number of transport blocks received from the first base station and the M number of transport blocks received from the second base station may be decoded by using the same reference signal.

According to the proposed technique (or method), in a situation where the synchronization of the base stations within the network matches, the first base station signals to the UE through the control information that both the first base station and the second base station within the base station group applying the manifold transmission method use the manifold transmission resources. At this point, since the UE does not know which base station is transmitting the transport block, if the manifold transmission resources are configured, the first base station as well as the second base station may transmit signals freely.

Additionally, the manifold transmission resources may be allocated to a subcarrier band in a distributed format during the predetermined subframe. Thus, a frequency diversity gain may be achieved.

Additionally, the UE may receive a manifold transmission activation indicator from the first base station. The manifold transmission activation indicator may indicate that both the first base station and the second base station may transmit the M number of transport blocks during the predetermined subframe. At this point, the first reference signal, a Modulation and Coding scheme (MCS) for a first transport block, among the M number of transport blocks, and a process ID may be received along with the manifold transmission activation indicator.

The MCS for a transport block may correspond to a symbol modulation scheme (or method) of the transport block and a code rate of a channel code. Since the first base station and the second base station transmit the M number of transport blocks to the UE without establishing any cooperation between one another, the UE may receive the transport blocks being transmitted from each of the first base station and the second base station as transport blocks that are being retransmitted. In order to receive the transport blocks being transmitted by each of the first base station and the second base station, a retransmission process ID is needed.

Additionally, the UE may combine the M number of transport blocks received from the first base station and the M number of transport blocks received from the second base station and may then perform decoding. At this point, the M number of transport blocks received from the first base station and the M number of transport blocks received from the second base station may be decoded by using the same MCS and/or the same temporary identifier.

Additionally, the UE may receive, from the first base station, a number of Orthogonal Frequency Division Multiplexing (OFDM) symbols that are used by the first base station and the second base station, during the predetermined subframe, for transmitting the M number of transport blocks. Since each of the TRPs uses the same modulation method and code rate, a number of OFDM symbols within a subframe being used by the base stations, which are included in the base station group being applied to the manifold transmission method, for transmitting transport blocks (data) applying the manifold transmission may be designated.

Additionally, in case the value M is an integer being greater than 1, the value M may correspond to a number of process IDs. This is based on the ability of the UE of receiving the transport blocks, which are transmitted from each of the first base station and the second base station, as though the corresponding transport blocks are retransmitted. For example, in order to allow four transport blocks to be received in the manifold transmission resources, the UE may be allocated with Process ID 1 to Process ID 4.

Moreover, the UE may transmit ACK signals corresponding to each of the M number of transport blocks to the first base station. When all of the ACK signals corresponding to the M number of transport blocks are transmitted, the resource allocation of the manifold transmission resources may be released (or cancelled). The resources to which the ACK signals corresponding to each of the M number of transport blocks are transmitted may be determined based on the indexes of the manifold transmission resources and the process IDs.

Furthermore, a reference signal for performing downlink channel estimation that is used by the first base station and a reference signal for performing downlink channel estimation that is used by the second base station may be respectively configured of sequences that are orthogonal to one another. In order to achieve an effect of having the transport blocks, which are transmitted from each base station, be combined in the UE, in a situation where the same reference signal is allocated, each base station is required to determine in advance the channel characteristics between the base station itself and the UE. Therefore, the reference signals for performing channel estimation may be configured to be orthogonal to one another for each base station.

The UE may receive a request for a channel quality value corresponding to a base station group, to which the manifold transmission method is applied, from the first base station. Thereafter, the UE may update the channel quality value corresponding to the base station group and may then transmit the updated channel quality value to the first base station. The UE may receive, from the first base station, identification information of the second base station, which is selected by the first base station, among the base station group. Thus, the UE may know (or acknowledge) that the second base station is included in the base station group for performing the manifold transmission.

Figure 18:
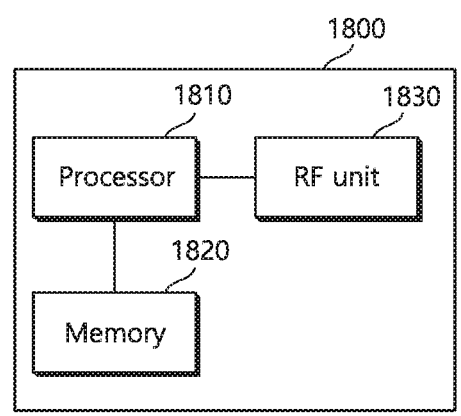
FIG. 18 is a block diagram showing an apparatus for wireless communication for implementing an embodiment of the present invention.

FIG. 18 is a block diagram showing an apparatus for wireless communication for implementing an embodiment of the present invention.

An apparatus (1800) for wireless communication includes a processor (1810), a memory (1820), and a radio frequency (RF) unit (1830).

The processor (1810) may be configured to implement proposed functions, procedures and/or methods described in this description. Layers of the radio interface protocol may be implemented in the processor (1810). The processor (1810) may handle a procedure explained above. The memory (1820) is operatively coupled with the processor (1810), and the RF unit (1830) is operatively coupled with the processor (1810).

The processor (1810) may include application-specific integrated circuit (ASIC), other chipset, logic circuit and/or data processing device. The memory (1820) may include read-only memory (ROM), random access memory (RAM), flash memory, memory card, storage medium and/or other storage device. The RF unit (1830) may include baseband circuitry to process radio frequency signals. When the embodiments are implemented in software, the techniques described herein can be implemented with modules (e.g., procedures, functions, and so on) that perform the functions described herein. The modules can be stored in the memory (1820) and executed by the processor (1810). The memory (1820) can be implemented within the processor (1810) or external to the processor (1810) in which case those can be communicatively coupled to the processor (1810) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for receiving a signal in a wireless communication system applying a manifold transmission scheme, comprising:
    receiving, from a first base station, control information for transmitting M number of transport blocks, wherein the control information includes allocation information for manifold transmission resources capable of being used by the first base station and a second base station during a predetermined subframe;
    receiving, from the first base station, a first reference signal through the manifold transmission resources;
    receiving, from the second base station, a second reference signal through the manifold transmission resources;
    receiving, from the first base station, the M number of transport blocks through the manifold transmission resources;
    receiving, from the second base station, the M number of transport blocks through the manifold transmission resources; and
    receiving, from the first base station, a manifold transmission activation indicator,
    wherein the first reference signal and the second reference signal are identical,
    wherein M is an integer being equal to or greater than 1,
    wherein the manifold transmission activation indicator indicates that the first base station and the second base station are capable of transmitting the M number of transport blocks during the predetermined subframe, and
    wherein the first reference signal, a Modulation and Coding scheme (MCS) corresponding to a first transport block, among the M number of transport blocks, and a process ID are received along with the manifold transmission activation indicator.

2. The method of claim 1, wherein the manifold transmission resources are allocated to a subcarrier band in a distributed format during the predetermined subframe.

3. The method of claim 1, further comprising:
    combining M number of transport blocks received from the first base station and M number of transport blocks received from the second base station and decoding the combined transport blocks,
    wherein the M number of transport blocks received from the first base station and the M number of transport blocks received from the second base station are encoded by using a same UE temporary identifier.

4. The method of claim 1, further comprising:
    receiving, from the first base station, a number of Orthogonal Frequency Division Multiplexing (OFDM) symbols being used by the first base station and the second base station for transmitting the M number of transport blocks during the predetermined subframe.

5. The method of claim 1, wherein, in case the value M is an integer being greater than 1, the value M corresponds to a number of process IDs.

6. The method of claim 5, further comprising:
    transmitting, to the first base station, ACK signals corresponding to each of the M number of transport blocks,
    wherein resource allocation of the manifold transmission resources is released when all ACK signals corresponding to each of the M number of transport blocks are transmitted, and
    wherein resources to which the ACK signals corresponding to each of the M number of transport blocks are determined based on an index of the manifold transmission resource and the process ID.

7. The method of claim 1, wherein a reference signal for performing downlink channel estimation being transmitted by the first base station and a reference signal for performing downlink channel estimation being transmitted by the second base station are configured to have sequences being orthogonal to one another.

8. A user equipment (UE) for receiving a signal in a wireless communication system applying a manifold transmission scheme, comprising:
    a radio frequency (RF) unit transmitting and receiving radio signals; and
    a processor being operatively connected to the RF unit,
    wherein the processor:
    receives, from a first base station, control information for transmitting M number of transport blocks, wherein the control information includes allocation information for manifold transmission resources capable of being used by the first base station and a second base station during a predetermined subframe;
    receives, from the first base station, a first reference signal through the manifold transmission resources;
    receives, from the second base station, a second reference signal through the manifold transmission resources;
    receives, from the first base station, the M number of transport blocks through the manifold transmission resources;
    receives, from the second base station, the M number of transport blocks through the manifold transmission resources;
    receives, from the first base station, a manifold transmission activation indicator,
    wherein the first reference signal and the second reference signal are identical, and
    wherein M is an integer being equal to or greater than 1,
    wherein the manifold transmission activation indicator indicates that the first base station and the second base station are capable of transmitting the M number of transport blocks during the predetermined subframe, and
    wherein the first reference signal, a Modulation and Coding scheme (MCS) corresponding to a first transport block, among the M number of transport blocks, and a process ID are received along with the manifold transmission activation indicator.

9. The user equipment of claim 8, wherein the manifold transmission resources are allocated to a subcarrier band in a distributed format during the predetermined subframe.

10. The user equipment of claim 8, wherein the processor combines M number of transport blocks received from the first base station and M number of transport blocks received from the second base station and decodes the combined transport blocks, and
wherein the M number of transport blocks received from the first base station and the M number of transport blocks received from the second base station are encoded by using a same UE temporary identifier.

11. The user equipment of claim 8, wherein the processor receives, from the first base station, a number of Orthogonal Frequency Division Multiplexing (OFDM) symbols being used by the first base station and the second base station for transmitting the M number of transport blocks during the predetermined subframe.

12. The user equipment of claim 8, wherein, in case the value M is an integer being greater than 1, the value M corresponds to a number of process IDs.

13. The user equipment of claim 12, wherein the processor transmits, to the first base station, ACK signals corresponding to each of the M number of transport blocks,
wherein resource allocation of the manifold transmission resources is released when all ACK signals corresponding to each of the M number of transport blocks are transmitted, and
wherein resources to which the ACK signals corresponding to each of the M number of transport blocks are determined based on an index of the manifold transmission resource and the process ID.

* * * * *